United States Patent [19]

Burroughs

[11] Patent Number: 4,458,923
[45] Date of Patent: Jul. 10, 1984

[54] FIRE HOSE LOCKING DEVICE

[76] Inventor: Robert E. Burroughs, P.O. Box 535, 1195 Baseline Ave., Bullhead City, Ariz. 86430

[21] Appl. No.: 275,349

[22] Filed: Jun. 19, 1981

[51] Int. Cl.³ .......................................... F16L 35/00
[52] U.S. Cl. .................................... 285/8; 285/80
[58] Field of Search ................ 285/8, 45, 80, 81; 137/382, 383; 70/232

[56] References Cited

U.S. PATENT DOCUMENTS

| 716,204 | 12/1902 | De Waldo | 70/232 |
|---|---|---|---|
| 725290 | 4/1903 | Speer . | |
| 748,720 | 1/1904 | Glazier | 285/80 X |
| 968759 | 8/1910 | Fogg . | |
| 994,409 | 6/1911 | Kelly | 137/382 X |
| 1,084,996 | 1/1914 | Wright | 137/383 X |
| 1,814,412 | 7/1931 | Rutten | 285/80 X |
| 2,048,424 | 7/1936 | Caldwell | 285/80 X |
| 3,009,483 | 11/1961 | Salustri | 285/80 X |
| 3,132,402 | 5/1964 | Joseph . | |
| 3,284,121 | 11/1966 | Lyon | 285/80 X |
| 3,367,358 | 2/1968 | Rentschler | 285/45 X |
| 3,439,942 | 4/1969 | Moore et al. . | |
| 3,540,468 | 11/1970 | Flack, Jr. . | |
| 3,678,717 | 7/1972 | Eaton | 285/80 X |
| 4,046,406 | 9/1977 | Press et al. | 285/47 |
| 4,300,373 | 11/1981 | Camos et al. | 285/80 X |

Primary Examiner—Thomas F. Callaghan
Attorney, Agent, or Firm—Christie, Parker & Hale

[57] ABSTRACT

A locking device is provided that is useful for preventing removal of a hose coupling from engagement on a valve. The locking device comprises two clamping members hingedly joined together at one end by an interlocking joint. When in a closed position, the clamping members have a first passage for receipt of the body of the valve and a second passage for receipt of the hose coupling on the valve. When the locking device is in place with the valve body in the first passage and the hose coupling in the second passage, the clamping members are locked together at the end remote from the interlocking joint to prevent the removal of the coupling from the valve.

14 Claims, 12 Drawing Figures

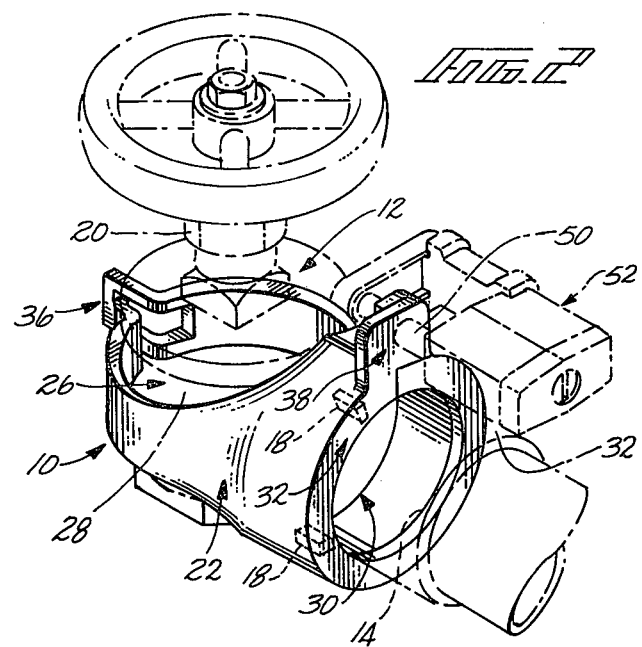
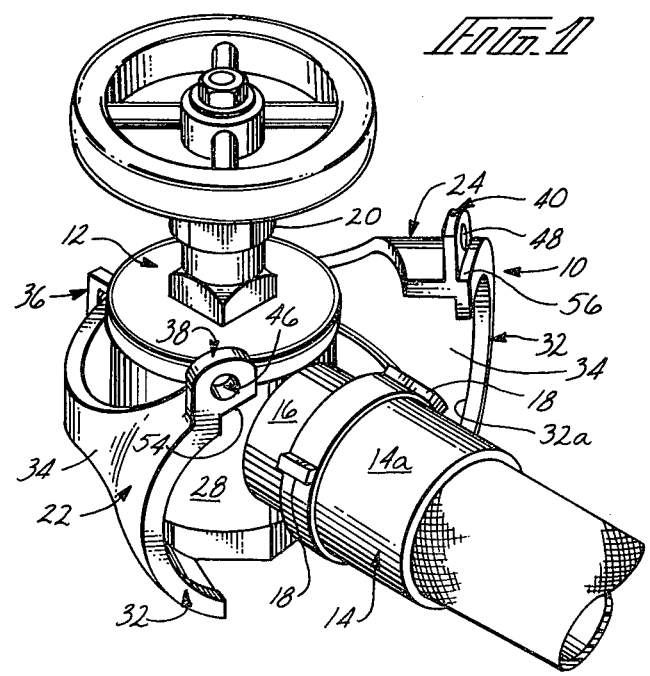

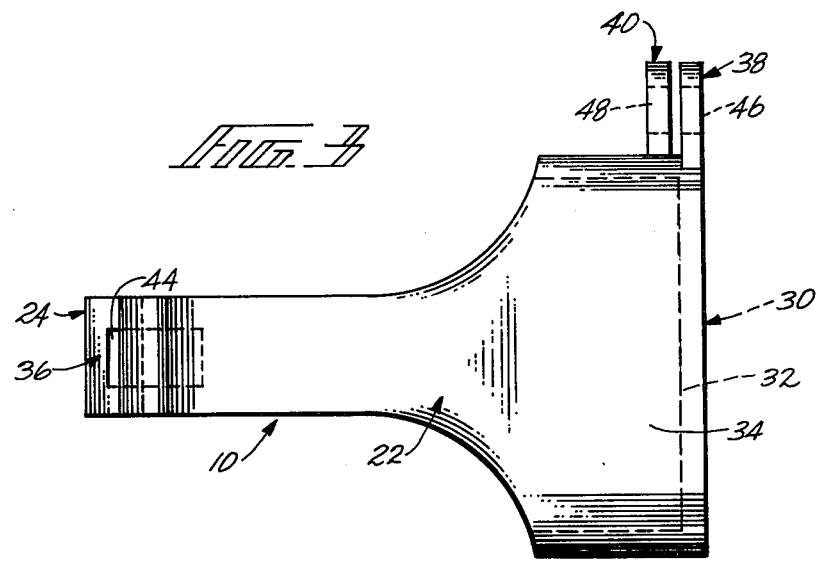
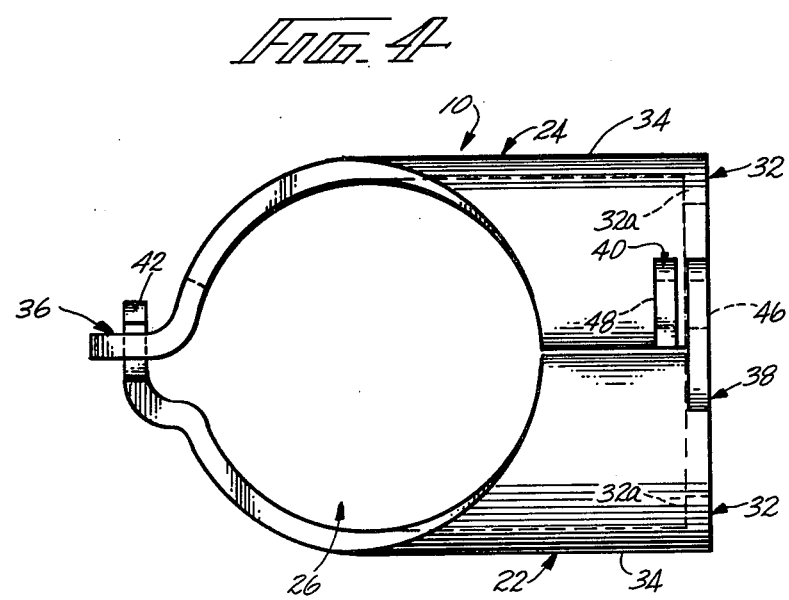

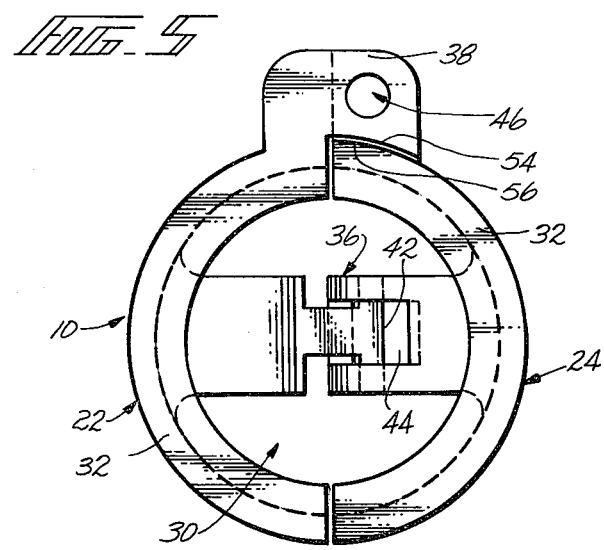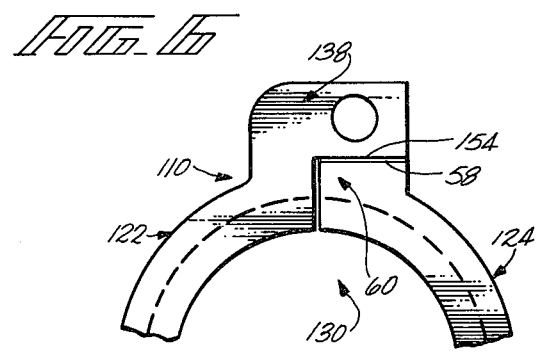

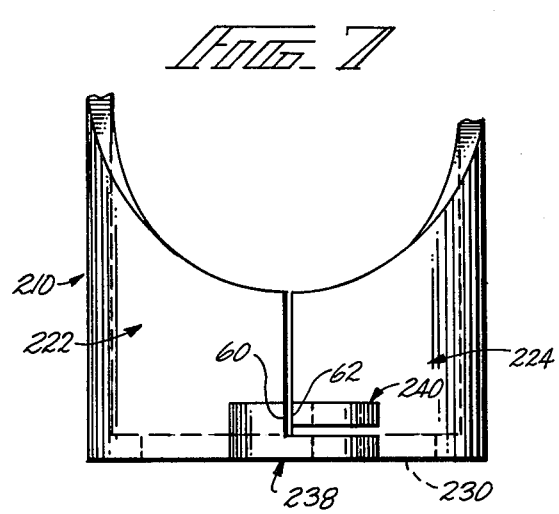
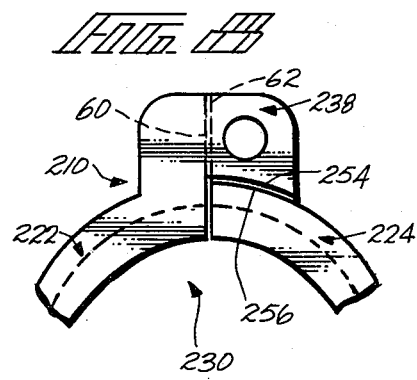
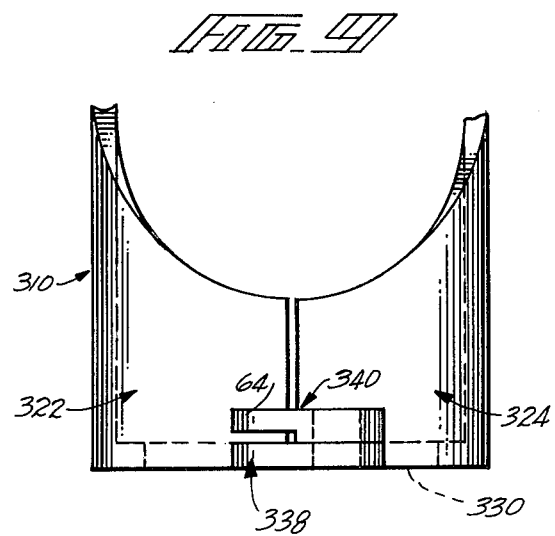
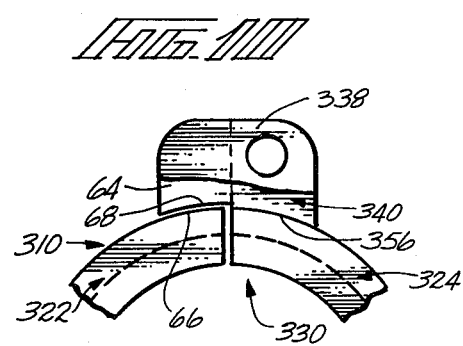

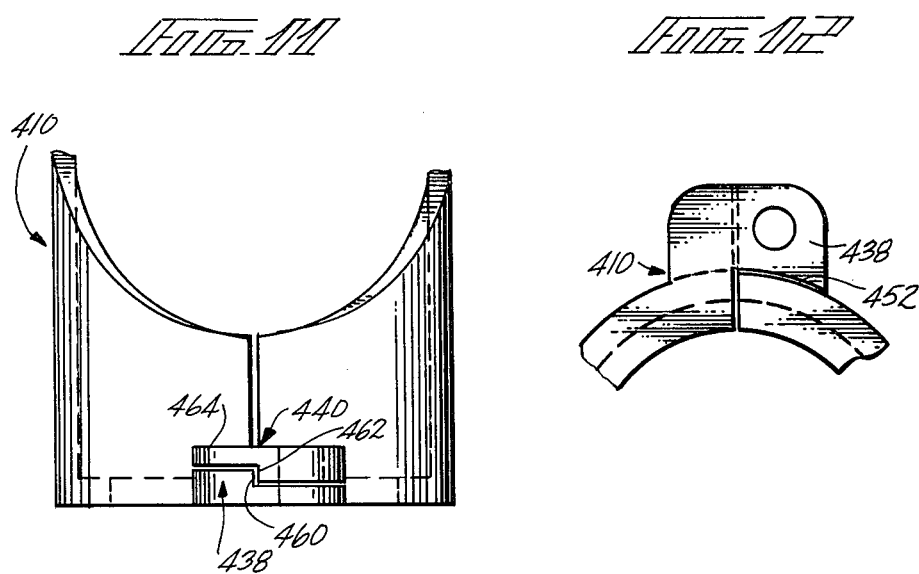

FIRE HOSE LOCKING DEVICE

FIELD OF THE INVENTION

This invention relates to a locking device for preventing removal of a hose coupling from engagement on a valve.

BACKGROUND OF THE INVENTION

Fire fighting cabinets or stations, each of which includes a fire hose connected to a water valve, are provided in schools, hospitals, office buildings, and factories throughout the United States. Because a rapid response to a fire can prevent the loss of a structure and can save people from being seriously injured or killed, such fire fighting stations are desirably maintained in a condition of readiness. Thus, it is important that fire hoses are available at the stations and that the hoses are maintained in a "hooked up" condition connected to the water valve so that the time it takes to respond to a fire is minimized. When fire fighting stations are maintained in such a condition of readiness, the fire fighter can respond rapidly to a fire by simply directing the hose nozzle at the fire and opening a single valve.

It presently is relatively easy to disconnect and remove fire hoses from the fire fighting stations. This presents problems because such hoses are frequently removed by personnel not authorized to do so. For instance, in factories, fire hoses are sometimes disconnected and removed from the stations for use in clean-up operations. Often, the hoses are damaged during such use and sometimes they are not replaced in their "hooked up" condition at the station. In any event, during unauthorized use, such a fire hose is not available at the fire fighting station for fighting fires.

Fire hoses are also frequently stolen from fire fighting stations for personal use.

Unauthorized use or theft of fire hoses is expensive because of the cost to replace damaged or stolen hoses and also because when such fire hoses are not in place when needed, response time to a fire can be significantly increased.

Therefore, there is a need for a relatively inexpensive and easy to install locking device for preventing unauthorized removal of a fire hose from its "hooked up" condition on a water valve.

SUMMARY OF THE INVENTION

This invention relates to a locking device for preventing removal of a hose coupling from engagement to a valve outlet on a valve. The locking device comprises first and second clamping members wherein the first and second clamping members, when in a closed position, comprise a first passage for receipt of a valve body and a second passage for receipt of a hose coupling engaged to the valve outlet. Additionally, means are provided for locking the first and second clamping members together on the valve for preventing removal of the hose coupling from the valve outlet.

DRAWINGS

These and other features, aspects, and advantages of the present invention will be more fully understood when considered with respect to the following detailed description, appended claims, and accompanying drawings wherein:

FIG. 1 is a perspective view of a preferred embodiment of a locking device provided in accordance with this invention in an open condition as it is being placed on a valve;

FIG. 2 is a perspective view of the locking device of FIG. 1 locked in place on the valve (the valve is shown in phantom);

FIG. 3 is a side view of the locking device of FIG. 1;

FIG. 4 is a plan view of the locking device of FIG. 1;

FIG. 5 is an end view of the locking device of FIG. 1;

FIG. 6 is a fragmentary end view of another preferred embodiment of a locking device provided in accordance with this invention;

FIG. 7 is a fragmentary plan view of another preferred embodiment of a locking device provided in accordance with this invention;

FIG. 8 is a fragmentary end view of the locking device of FIG. 7;

FIG. 9 is a fragmentary plan view of another preferred embodiment of a locking device provided in accordance with this invention;

FIG. 10 is a fragmentary partially cut away end view of the locking device shown in FIG. 9;

FIG. 11 is a fragmentary plan view of yet another preferred embodiment of a locking device provided in accordance with this invention; and FIG. 12 is a fragmentary end view of the locking device of FIG. 11.

DETAILED DESCRIPTION

Referring to FIGS. 1 through 5, there is shown a preferred embodiment of a locking device 10 provided in accordance with this invention. As can best be seen by referring to FIGS. 1 and 2, the locking device 10 can be locked in place on a valve 12 for preventing removal of a hose coupling 14 from the valve.

Although locking devices provided in accordance with this invention can have various sizes and shapes, depending on the size and shape of the valve and coupling on which they are to be used, such locking devices are described below with reference to the configuration of the valve 12 and the coupling 14 shown in the drawings.

In this instance, the valve 12 is a standard water valve used for connection to a standard fire hose coupling. The valve outlet 16 has external threads (not shown) onto which the internally threaded coupling 14 is screwed. Ears 18 extend from the coupling for gripping with the hand or for engagement with a coupling tool used to torque the coupling on the valve outlet.

Although locking devices provided in accordance with this invention can be placed on valves that are positioned at any angle, for purposes of exposition herein, the position of the components of the locking device relative to each other are described as if the device is on the valve 12 as it is oriented in the figures, i.e., with its stem 20 extending vertically upwardly and the outlet 16 extending horizontally.

The locking device 10 comprises two members, a first clamping member 22 and a second clamping member 24. Preferably, the clamping members are formed of metal such as various grades of steel or aluminum or the like, but if desired, other suitable materials such as high strength or reinforced plastics can be used.

The first and second clamping members, when in a closed position, as shown best in FIGS. 2–5, comprise a first passage 26 for receipt of the body 28 of the valve 12 and a second passage 30 for receipt of the hose coupling 14 when the coupling is connected to the valve outlet 16. The first and second passages 26 and 30 communicate with each other and, in this instance, because of the configuration of the valve 12, the passages are generally cylindrical and have their axes extending transverse at substantially right angles to each other.

When a valve is used that has its outlet positioned at a different angle relative to its body than is the case with the valve 12, locking devices provided in accordance with this invention can be designed to accommodate such valve configurations.

A semi-circular flange 32 on each clamping member defines the opening of the second passage 30. The flanges 32 extend inwardly and are in a plane substantially perpendicular to the axis of the second passage. Thus, the diameter of the opening of the second passage is less than the diameter of the remaining portion of the second passage defined by the interior of the walls 34 of the clamping members.

Preferably, the diameter of the opening of the second passage 30 through flanges 32 is only slightly greater than the diameter of the coupling body 14a. When the clamping members 22 and 24 are in a closed position on the valve 12 (best seen in FIG. 2), the ears 18 (shown in phantom) are inside the second passage 30 and extend beyond the inside diameter of the flanges 32 in the passage opening. Therefore, access to the ears 18 is not possible. Additionally, since the ears extend beyond the inside diameter of the flanges in the opening, the inner surfaces 32a of the inwardly extending flanges provide an abutting surface for the ears and the coupling cannot be removed through the opening.

If desired, the flanges need not be continuous, but can comprise a series of inwardly extending flange sections so long as the gap between each section is narrower than the width of the coupling ears. Thus, even if the ears could be aligned with such gaps, the coupling could not be pulled through the opening.

In accordance with this invention, means are provided for locking the first and second clamping members 22 and 24 in their closed position on the valve 12 and coupling 14 to prevent access to the ears 18 and removal of the coupling from the valve.

In the illustrated embodiment, the locking means comprise an interlocking joint 36 between the first and second clamping members and first and second locking lugs 38 and 40 on the first and second clamping members, respectively.

The interlocking joint 36 preferably comprises a T-shaped section 42 (best seen in FIGS. 4 and 5) on the end of the first clamping member remote from the flange 32. Additionally, the joint 36 comprises an elongated slot 44 on the mating end of the second clamping member, i.e., the end of the second clamping member remote from its flange 32.

To form the joint 36, the cross bar of the T is positioned about parallel to the longitudinal axis of the slot 44 and the T is inserted through the slot. The coupling members are then turned 90° relative to each other so that the cross bar of the T is transverse to the longitudinal axis of the slot. Both ends of the cross bar of the T extend beyond the slot for providing the joint 36 and for locking the clamping members together. If desired, other connections can be made between the clamping members; for example, the clamping members can be permanently hinged together at the end remote from the flange 32. However, when the interlocking joint 36, as described above, is provided, economics of manufacture of the clamping members is enhanced.

As described above, the first locking lug 38 is on the first clamping member 22 and the second locking lug 40 is on the second clamping member 24. Additionally, an opening 46 is through the first locking lug and an opening 48 is through the second locking lug.

When the clamping members are in a closed position, the locking lug openings 46 and 48 are in alignment for receipt of the shaft 50 of a lock 52 (shown in FIG. 2). Preferably, the axes of the locking lug openings are about parallel to the axis of the second generally cylindrical passage 30. When the lug openings are positioned as described above, instead of at other angles, as for example transverse to the axis, the distance that the clamping members can be pulled apart by rotating them downwardly about the axis of the second opening is minimized.

In the illustrated embodiment, the interlocking joint 36 is about on the axis of the second passage 30 at the oposite end of the locking device from the flanges 32. The interlocking joint 36 allows the clamping members to be rotated apart at the opening of the second passage when the shaft of a lock is out of the locking lug openings. (The clamping members 22 and 24 are shown rotated apart in FIG. 1.) Additionally, the interlocking joint maintains the clamping members locked securely together when they are in their closed position with the shaft of the lock in the lug openings.

The locking device 10 additionally comprises means for restricting the first and second clamping members from being rotated about the axis of the second passage 30 when the shaft of the lock is in the lug openings.

In this embodiment, the rotation restricting means comprises a bottom surface 54 of the first locking lug 38 and an upper surface 56 on the top of the second clamping member 24. The bottom surface 54 is operatively disposed above the underlying portion 56 of the top surface of the second clamping member 24 when the clamping members are in a closed position. The first locking lug bottom surface 54 preferably has a radius of curvature about the same as the radius of curvature of the underlying portion 56 of the surface of the second clamping member.

As can best be understood by referring to FIGS. 2 and 5, when the clamping members are locked together on a valve, they cannot be pulled apart by rotating them upwardly about the axis of the second passage 30 because the bottom surface 54 of the first lug contacts the portion of the second clamping member surface for restricting such rotation.

It is important that the first and second clamping members cannot be pulled apart more than about a quarter inch at their bottoms to prevent access to the coupling ears.

Referring now to FIG. 6, there is shown a fragmentary end view of another preferred embodiment of a locking device 110 provided in accordance with this invention. The locking device 110 is similar to the locking device 10 described above with the exception of the means for restricting rotation of the first and second clamping members 122 and 124 about the axis of the second passages 130. In this embodiment, the rotation restricting means comprises a flat bottom surface 154 of the first locking lug 138 and a flat surface 58 of an extension 60 on the second clamping member 124. The bottom surface of the locking lug 138 is operatively disposed above the flat surface 58 of the extension 60 of the second clamping member 124.

As was the case in the previously described embodiment, when the clamping members 122 and 124 are locked together on a valve in a closed position, they cannot be pulled apart by rotating them upwardly about the axis of the second opening passage 130 because, in this case, the bottom surface 154 of the first locking lug 138 contacts the top surface 58 of the extension 60 for restricting such rotation.

Referring now to FIGS. 7 and 8, there is shown another preferred embodiment of a locking device 210 provided in accordance with this invention. The locking device 210 is similar to the locking device 10 described above with the exception that the first locking lug 38 is modified to provide additional means for restricting rotation of the first and second clamping members 222 and 224 about the axis of the second passage 230.

The first portion of the rotation restricting means of this embodiment is similar to that of the locking device 10 and comprises a bottom surface 254 of the first locking lug 238 and an underlying portion 256 of the top surface of the second clamping member 224. The bottom surface 254 is operatively disposed above the underlying portion 256. Additionally, the bottom surface 254 has a radius of curvature about the same as the radius of curvature of the underlying portion 256 of the second clamping member. The additional rotation restricting means is provided by a generally vertical surface 60 on the first locking lug 238 which abuts and is operatively disposed adjacent a facing generally vertical surface 62 of the second locking lug 240.

In this embodiment, when the clamping members 222 and 224 are locked together on a valve, they cannot be pulled apart by rotating them upwardly about the axis of the second passage 230 because the bottom surface 254 of the first locking lug contacts the top surface 256 of the second clamping member and additionally because the generally vertical surface 60 of the first locking lug contacts the adjacent facing vertical surface 62 of the second locking lug.

Referring now to FIGS. 9 and 10, there is shown another preferred embodiment of a locking device 310 provided in accordance with this invention. The locking device 310 is similar to the locking device 10 described above with the exception that the second locking lug 340 is modified to provide additional means for restricting rotation of the first and second clamping members 322 and 324 about the axis of the second opening 330. The first portion of the rotation restricting means of this embodiment is similar to that of the locking device 10 and comprises a bottom surface (not shown) of a first locking lug 338 similar to the bottom surface 54 of the first locking lug 38 of FIGS. 1 through 5. The bottom surface of the first locking lug 338 is operatively disposed above an underlying portion 356 of the top surface of the clamping member 324. FIG. 10 shows the bottom portion of the first locking lug 338 cut away to more clearly show the lower configuration of the second locking lug 340.

The additional rotation restricting means is provided by an arm 64 on the second locking lug 340 that extends over an underlying portion 66 of the top surface of the first clamping member 322. The bottom surface 68 of the second locking lug arm 64 preferably has a radius of curvature about the same as the radius of curvature of the underlying portion 66 of the first clamping member.

In this embodiment, when the clamping members 322 and 324 are locked together on a valve, they cannot be pulled apart by rotating them upwardly about the axis of the second passage 330 because the bottom surface of the first locking lug 340 contacts the adjacent top surface of the second clamping member. Additionally, the bottom surface 68 of the second clamping member arm 64 contacts the surface 66 of the first clamping member.

Referring now to FIGS. 11 and 12, there is shown yet another preferred embodiment of a locking device 410 provided in accordance with this invention. The locking device 410 is similar to the locking device 10 described above with the exception that the locking lugs 438 and 440 combine the rotation restricting features described in the embodiments shown in FIGS. 1-10.

In this instance, the bottom surface 452 of the lug 438 is similar to the bottom surface 52 of the locking lug 38 of FIGS. 1-5. Additionally, the second locking lug 440 comprises an arm 464 similar to the arm 64 of FIGS. 9 and 10. Also, a vertical surface 460 is provided on the first locking lug 438 operatively disposed adjacent a facing generally vertical surface 462 on the second locking lug 440. The vertical surfaces 460 and 462 are similar to the vertical surfaces 60 and 62 of FIGS. 7 and 8.

The above description of preferred embodiments of locking devices provided in accordance with this invention is for illustrative purposes. Because of variations which will be apparent to those skilled in the art, the present invention is not intended to be limited to the particular embodiments described hereinabove. The scope of the invention is defined in the following claims.

What is claimed is:

1. A locking device for preventing removal of a hose coupling from engagement to a valve outlet on a valve, the locking device comprising:
   first and second clamping members wherein the first and second clamping members, when in a closed position, comprise:
   (a) a first generally cylindrical passage for receipt of a valve body;
   (b) a second generally cylindrical passage for receipt of a hose coupling engaged to the valve outlet; and
   (c) means for locking the first and second clamping members together on the valve for preventing removal of the hose coupling from the valve outlet, said locking means comprising:
      (i) a first locking lug on the first clamping member; and
      (ii) a second locking lug on the second clamping member, the locking lugs each having an opening, wherein when the clamping members are in a closed position the locking lug openings are in alignment for receipt of the shaft of a lock with the axes of said locking lug openings being substantially parallel to the axis of the second generally cylindrical passage; and
   wherein the first and second clamping members each comprise a semi-circular flange extending inwardly in a plane substantially perpendicular to the axis of the second generally cylindrical passage for defining the opening of the second passage, the inner surface of such inwardly extending flanges providing an abutting surface for ears which extend from the surface of the hose coupling beyond the diameter of the opening of the second passage for preventing removal of the hose coupling from the valve outlet when the first and second clamping members are locked together on the valve.

2. A locking device as claimed in claim 1 additionally comprising means for restricting the first and second clamping members from being rotated about the axis of the second generally cylindrical passage when the shaft of a lock is in the locking lug openings.

3. A locking device for preventing removal of a hose coupling from engagement to a valve outlet on a valve, the locking device comprising:
   first and second clamping members wherein the first and second clamping members, when in a closed position, comprise:
   (a) a first generally cylindrical passage for receipt of a valve body;
   (b) a second generally cylindrical passage for receipt of a hose coupling engaged to the valve outlet; and
   (c) means for locking the first and second clamping members together on the valve for preventing removal of the hose coupling from the valve outlet; said locking means comprising:
      (i) a first locking lug on the first clamping member;
      (ii) a second locking lug on the second clamping member, the locking lugs each having an opening wherein when the clamping members are in a closed position the locking lug openings are in alignment for receipt of the shaft of a lock with the axes of said locking lug openings being substantially parallel to the axis of the second generally cylindrical passage; and
      (iii) an interlocking joint between the first and second clamping members adjacent the first generally cylindrical passage wherein such an interlocking joint is adapted to allow the clamping members to be rotated apart at the second generally cylindrical passage when the shaft of a lock is out of the locking lug openings; and
   wherein the first and second clamping members each comprise a semi-circular flange extending inwardly in a plane substantially perpendicular to the axis of the second generally cylindrical passage for defining the opening of the second passage, the inner surface of such inwardly extending flanges providing an abutting surface for ears which extend from the surface of the hose coupling beyond the diameter of the opening of the second passage for preventing removal of the hose coupling from the valve outlet when the first and second clamping members are locked together on the valve.

4. A locking device as claimed in claim 3 wherein the interlocking joint is about on the axis of the second generally cylindrical passage at the opposite end of the locking device from the semi-circular flanges.

5. A locking device for preventing removal of a hose coupling from engagement to a valve outlet on a valve, the locking device comprising:
   first and second clamping members wherein the first and second clamping members, when in a closed position, comprise:
   (a) a first generally cylindrical passage for receipt of a valve body;
   (b) a second generally cylindrical passage for receipt of a hose coupling engaged to the valve outlet;
   (c) means for locking the first and second clamping members together on the valve for preventing removal of the hose coupling from the valve outlet, said locking means comprising:
      (i) a first locking lug on the first clamping member; and
      (ii) a second locking lug on the second clamping member, the locking lugs each having an opening, wherein when the clamping members are in a closed position the locking lug openings are in alignment for receipt of the shaft of a lock with the axes of said locking lug openings being substantially parallel to the axis of the second generally cylindrical passage; and
   (d) means for restricting the first and second clamping members from being rotated about the axis of the second generally cylindrical passage when the shaft of a lock is in the locking lug openings, the rotation restricting means comprising a bottom surface of the first locking lug which is operatively disposed adjacent an underlying portion of the top surface of the second clamping member, said bottom surface having a radius of curvature about the same as the radius of curvature of the underlying portion of the second clamping member wherein the first and second clamping members each comprise a semi-circular flange extending inwardly in a plane substantially perpendicular to the axis of the second generally cylindrical passage for defining the opening of the second passage, the inner surface of such inwardly extending flanges providing an abutting surface for ears which extend from the surface of the hose coupling beyond the diameter of the opening of the second passage for preventing the removal of the hose coupling from the valve outlet when the first and second clamping members are locked together on the valve.

6. A locking device as claimed in claim 5 wherein the rotation restricting means additionally comprise a generally vertical side of the first locking lug which is operatively disposed adjacent a facing generally vertical side of the second locking lug.

7. A locking device as claimed in claims 5 or 6 wherein the rotation restricting means additionally comprise an arm of the second locking lug that operatively extends over an underlying portion of the first clamping member, the bottom surface of the second locking lug arm having a radius of curvature about the same as the radius of curvature of the underlying portion of the first clamping member.

8. A locking device for preventing removal of a hose coupling from engagement to a valve outlet on a valve, the locking device comprising:
   first and second clamping members wherein the first and second clamping members, when in a closed position, comprise:
   (a) a first generally cylindrical passage for receipt of a valve body;
   (b) a second generally cylindrical passage for receipt of a hose coupling engaged to the valve outlet;
   (c) means for locking the first and second clamping members together on the valve for preventing removal of the hose coupling from the valve outlet, said locking means comprising:
      (i) a first locking lug on the first clamping member; and
      (ii) a second locking lug on the second clamping member, the locking lugs each having an opening, wherein when the clamping members are in a closed position the locking lug openings are in alignment for receipt of the shaft of a lock with the axes of said locking lug openings being substantially parallel to the axis of the second generally cylindrical passage; and
   (d) means for restricting the first and second clamping members from being rotated about the axis of the second generally cylindrical passage when the shaft of a lock is in the locking lug openings, the rotation restricting means comprising a flat bottom surface of the first locking lug operatively disposed above a flat top surface of an extension of the second clamping member; wherein the first and second clamping members each comprise a semi-circular flange extending inwardly in a plane substantially perpendicular to the axis of the second generally cylindrical passage for defining the opening of the second passage, the inner surface of such inwardly extending flanges providing an abutting surface for ears which extend from the surface of the hose coupling beyond the diameter of the opening of the second passage for preventing removal of the hose coupling from the valve outlet when the first and second clamping members are locked together on the valve.

9. A locking device for preventing removal of a hose coupling from engagement on a valve, the locking device comprising:

a first clamping member and a second clamping member, wherein the first and second clamping members, when in a closed position, comprise:
(a) a first generally cylindrical passage for receipt of a valve body;
(b) a second generally cylindrical passage for receipt of a hose coupling mounted on the valve outlet, wherein the axis of the first passage is transverse to the axis of the second passage;
(c) a first locking lug on the first clamping member and a second locking lug on the second clamping member, the locking lugs each having an opening, the locking lug openings being in alignment for receipt of the shaft of a lock with the axes of the locking lug openings being substantially parallel to the axis of the second cylindrical passage; and
(d) an interlocking joint between the first and second clamping members adjacent the first cylindrical passage, the interlocking joint adapted to allow the clamping members to be rotated apart at the second passage when the shaft of a lock is out of the locking lug openings and wherein the first and second clamping members are held in close abutting relation by the interlocking joint and the locking lugs when the shaft of a lock is positioned in the locking lug openings.

10. A locking device as claimed in claim 9 additionally comprising means for restricting the first and second clamping members from being rotated about the axis of the second generally cylindrical opening when the shaft of a lock is in the locking lug openings.

11. A locking device as claimed in claim 10 wherein the rotation restricting means comprise a bottom surface of the first locking lug operatively disposed adjacent an underlying portion of the top surface of the second clamping member, the bottom surface of said first locking lug having a radius of curvature about the same as the radius of curvature of the underlying portion of the second clamping member.

12. A locking device on a valve for preventing removal of a hose coupling from engagement to the valve outlet comprising:
(a) a valve having a body portion and an outlet;
(b) a hose coupling on the valve outlet;
(c) first and second clamping members in a closed position on the valve, the clamping members, when closed, comprise:
(i) a first generally cylindrical passage for receipt of the valve body;
(ii) a second generally cylindrical passage for receipt of the hose coupling on the valve outlet, wherein the axis of the first passage is transverse to the axis of the second passage;
(iii) a first locking lug on the first clamping member and a second locking lug on the second clamping member, the locking lugs each having an opening, with the openings being in alignment for receipt of the shaft of a lock with the axes of the locking lug openings being substantially parallel to the axis of the second cylindrical passage; and
(d) an interlocking joint between the first and second clamping members adjacent the first cylindrical passage, the interlocking joint adapted to allow the clamping members to be rotated apart at the second passage when the shaft of a lock is out of the locking lug openings and wherein the first and second clamping members are held in close abutting relation by their interlocking joint and the locking lugs when the shaft of a lock is positioned in the locking lug openings.

13. A locking device as claimed in claim 12 additionally comprising means for restricting the first and second clamping members from being rotated about the axis of the second generally cylindrical opening when the shaft of a lock is in the locking lug openings.

14. A locking device as claimed in claim 13 wherein the rotation restricting means comprise a bottom surface of the first locking lug operatively disposed adjacent an underlying portion of the top surface of the second clamping member, the bottom surface of said first locking lug having a radius of curvature about the same as the radius of curvature of the underlying portion of the second clamping member.

* * * * *